Nov. 21, 1961  R. J. WILLIAMS  3,009,712
VEHICLE STEERING LINKAGE AND JOINT CONSTRUCTION
Filed Aug. 7, 1957  2 Sheets-Sheet 1
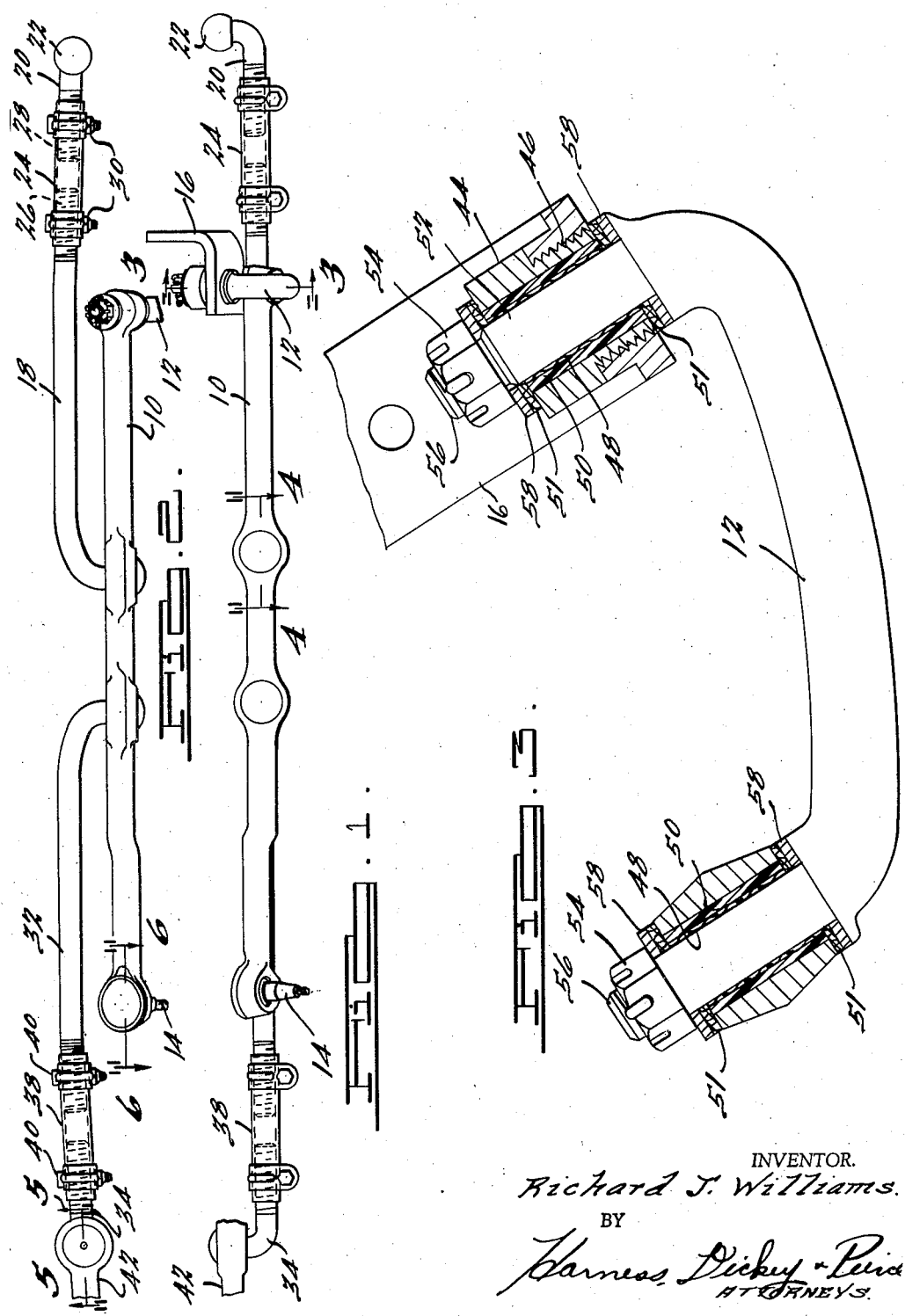
INVENTOR.
Richard J. Williams.
BY
Harness, Dickey & Pierce
ATTORNEYS.

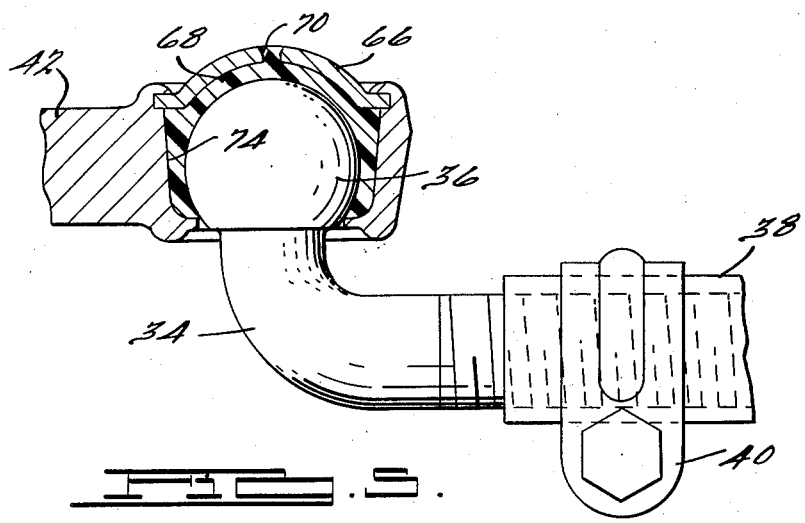
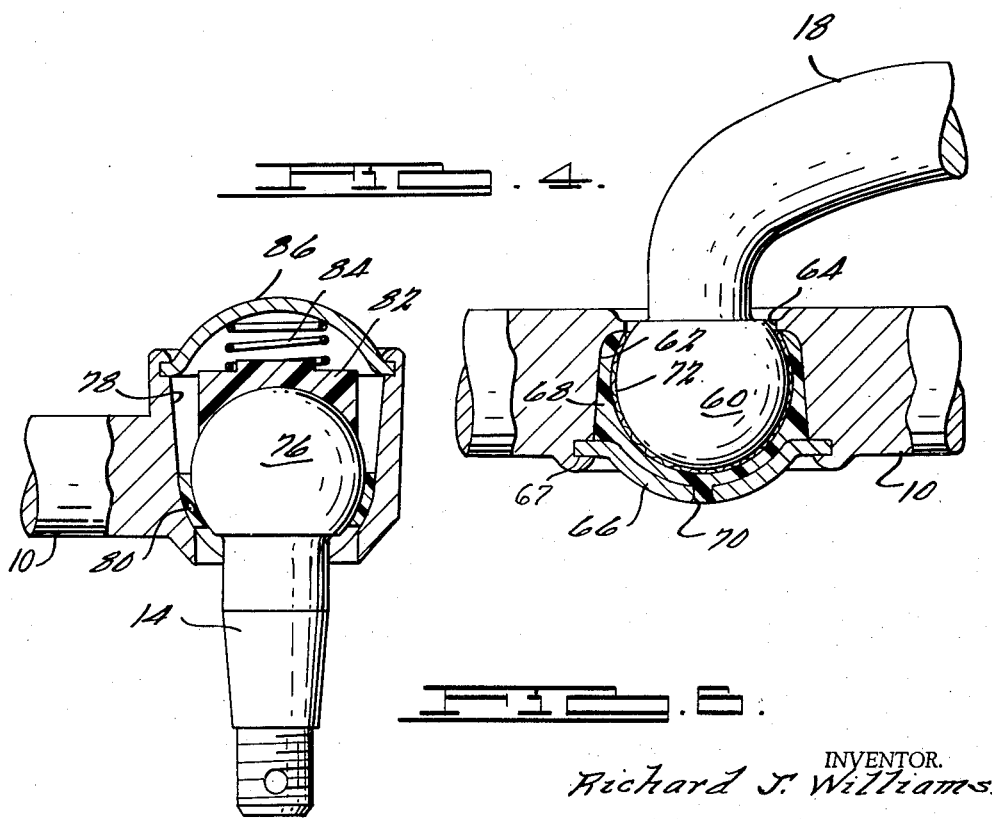

3,009,712
VEHICLE STEERING LINKAGE AND
JOINT CONSTRUCTION
Richard J. Williams, Birmingham, Mich., assignor to American Metal Products Company, Detroit, Mich., a corporation of Michigan
Filed Aug. 7, 1957, Ser. No. 676,752
3 Claims. (Cl. 280—95)

This invention relates to steering linkages for automotive vehicles and particularly to a ball joint construction for the steering linkage of an automotive vehicle.

The main objects of the invention are to provide a ball joint construction for the steering linkage of an automotive vehicle; to provide a joint for connecting a rod having a ball on the end thereof to a connecting link intermediate the ends thereof; to provide a joint for connecting a rod having a ball on the end thereof to a connecting link intermediate the ends thereof wherein a molded backing material forms a bearing surface for the joint; to provide a joint for connecting a rod having a ball on the end thereof to a connecting link intermediate the ends thereof which is relatively inexpensive to fabricate, rugged in construction, and effective in use.

Other objects and features of novelty of the invention will be specifically pointed out or otherwise become apparent when referring, for a better understanding of the invention, to the following description taken in conjunction with the accompanying drawings, wherein:

FIGURE 1 is a plan view of a steering linkage for an automotive vehicle embodying features of the invention;

FIG. 2 is an elevational view of the structure illustrated in FIG. 1;

FIG. 3 is an enlarged sectional view of the structure illustrated in FIG. 1, taken along the line 3—3 thereof;

FIG. 4 is an enlarged sectional view of the structure illustrated in FIG. 1, taken along the line 4—4 thereof;

FIG. 5 is an enlarged sectional view of the structure illustrated in FIG. 2, taken along the line 5—5 thereof; and FIG. 6 is an enlarged sectional view of the structure illustrated in FIG. 2, taken along the line 6—6 thereof.

Referring to FIGS. 1 and 2, a steering linkage embodying features of the invention is comprised of a connecting link 10 having one end thereof pivotally connected to an idler arm 12 with the other end thereof having a ball stud 14 universally mounted therein which connects the link 10 to the conventional Pitman arm (not shown) of an automotive vehicle. The other end of the idler arm 12 is pivotally connected to a bracket 16 which is adapted to be mounted on the chassis frame of the automotive vehicle.

A rod 18 is connected to the connecting link 10 intermediate the ends thereof in a manner to permit universal movement between the rod and the connecting link as will be described in greater detail hereinafter. The other end of the rod 18 is connected to a rod 20 by an internally threaded sleeve 24 screwed onto threaded ends 26 and 28 of the rods 18 and 20 in a turnbuckle arrangement. Spaced apart clamps 30 encircle and clamp the sleeve 24 to the rods 18 and 20.

A rod 32 is connected to the connecting link 10 intermediate the ends thereof in a similar manner as the rod 18, and has the other end thereof similarly connected to a rod 34 by an internally threaded sleeve 38 and clamps 40. The rods 20 and 34 have balls 22 and 36, respectively, on the ends thereof which are universally connected to steering arms 42 which in turn are connected to the front wheels of the automotive vehicle. Only one of the steering lever arms is illustrated, and it is connected to the rod 34 by the ball 36, but it is to be understood that the rod 20 would be similarly connected to a steering lever arm (not shown) by the ball 22.

In operation, actuation of the steering gear mechanism by rotation of the steering wheel of the automotive vehicle moves the connecting link 10 either to the right or left as viewed in FIG. 1 which actuates the rods 18 and 32 connected thereto to turn the front wheels of the automotive vehicle, the rod 20 and steering lever arm 42 being connected to the front wheels as previously described. The idler arm 12 pivots about the bracket 16 in response to the movement of the connecting link 10 to provide an appropriate support for the end of the connecting link opposite the end connected to the steering gear mechanism.

Referring to FIG. 3, the idler arm 12 is connected to the bracket 16 by a housing 44 screwed into an internally threaded aperture 46 of the bracket 16. A bushing comprised of a layer of "Teflon" or other low friction bearing material 48 bonded to the inner surface of a backing material 50 is disposed within the housing 44 to provide a bearing surface for a cylindrical portion 52 on the end of the idler link 12. Washers 51 of low friction material are disposed adjacent the ends of the bushing to provide additional bearing surfaces. A nut 54 is screwed onto thread 56 on the end of the cylindrical portion 52 with suitable washers 58 provided adjacent each of the washers 51. The other end of the idler arm 12 is similarly connected to the end of the connecting link 10.

Referring to FIG. 4, the end of the rod 18 is connected to the connecting link 10 by means of a ball 60 formed on the end of the rod 18 and disposed within a cavity 62 in the connecting link 10. One end of the cavity 62 has an aperture 64 which is smaller in diameter than the ball 60 and therefore the end of the rod 18 without the ball must be inserted through the aperture 64 from below, as viewed in FIG. 4, and the rod pulled through until it is in the position illustrated in FIG. 4.

A suitable cap 66 is then mounted to enclose the cavity 62 and held in position by spinning over flanges 67. A hardenable backing material 68 is injected through an aperture 70 in the cap 66 to conform a layer of "Teflon" or other low friction bearing material 72 to the ball 60 and provide a suitable backup for the bearing material. In this manner the rod 18 is connected to the connecting link 10 in a manner to permit universal movement without the need for a stud and ball or other connecting element.

Referring to FIG. 5, the ball 36 is mounted in a cavity 74 in the end of the steering lever arm 42 similar to the manner in which the ball 60 is mounted in the cavity 62. The end cap 66 is provided as before and the hardenable backing material 68 is injected through the aperture 70 so as to conform to the surface of the ball 36 and form a bearing surface therefor when it hardens. It will be observed that the layer of "Teflon" or other low friction bearing material 72 is not provided as in FIG. 4 and that the backing material 68 itself functions as the bearing surface. Depending on the application, one may or may not employ the layer of "Teflon" or other low friction bearing material 72. A number of materials are suitable for use as the hardenable backing material 68. Polyethylene molding compounds may be employed, two being procurable on the market, one under the name of "Super-dyland," the other under the name of "Marlex." Phenolic impregnated glass fibrous material procurable in the trade under the name of Durez, and a form of nylon material, procurable on the market, under the name of "Zytel," have also been employed, as well as, a phenolic and polyethylene impregnated glass fibrous material. These materials do not have the extreme low friction characteristics of "Teflon" or the like but are satisfactory for some less severe applications.

Referring to FIG. 6, the ball 76 on the end of the ball stud 14 is supported in a cavity 78 in the end of the connecting link 10 by an annular bearing ring 80. A bearing 82 is urged against the upper surface of the ball 76 by a spring 84 disposed between the bearing 82 and a cap 86 covering the upper portion of the cavity 78. The bearings 80 and 82 may be made of steel, or the hardenable backing material 68, either by itself or with a layer of "Teflon" or other low friction material 72 on the surface thereof, if desired. Of course, it is apparent that this bearing construction could also be applied for supporting the balls 60 and 36 of FIGS. 4 and 5 respectively.

From the above description, it is apparent that ball joint connections have been provided for connecting the elements of a steering linkage in an inexpensive, easily fabricated yet rugged and durable manner. Further, by mounting the balls on the bent ends of the rods as integral units, additional benefits are realized because of the parts eliminated and the simplification of the fabrication of the steering linkage.

What is claimed is:

1. In a vehicle steering linkage assembly, a connecting link member having a pair of spaced apart cavities formed therein intermediate the ends thereof, each of said cavities opening on opposite surfaces of said connecting link member, a first tie rod having one end thereof bent at approximately a right angle, an integral ball formed on said one end of said first tie rod and disposed within one of said cavities, a second tie rod having one end thereof bent at approximately a right angle, an integral ball formed on said one end of said second tie rod and disposed within the other of said cavities, the two openings on one of said surfaces having a smaller diameter than said balls and the two openings on the other of said surfaces having a larger diameter than said balls, each of said tie rods extending through the smaller openings on said one surface, plastic bearing means completely filling said cavities for journaling each ball within its respective cavity to provide limited universal movement between each of the tie rods and the link member, and means for connecting the other ends of each of said tie rods to different ones of a pair of wheels to be steered.

2. In a vehicle steering linkage assembly, a connecting link member having a pair of spaced apart cavities formed therein intermediate the ends thereof, each of said cavities opening on opposite surfaces of said connecting link member, a first tie rod having one end thereof bent at approximately a right angle, an integral ball formed on said one end of said first tie rod and disposed within one of said cavities, a second tie rod having one end thereof bent at approximately a right angle, an integral ball formed on said one end of said second tie rod and disposed within the other of said cavities, the two openings on one of said surfaces having a smaller diameter than said balls and the two openings on the other of said surfaces having a larger diameter than said balls, each of said tie rods extending through the smaller openings on said one surface, bearing means in said cavities for journaling each ball within its respective cavity to provide limited universal movement between each of the tie rods and the link member, and means for connecting the other ends of each of said tie rods to different ones of a pair of wheels to be steered.

3. The invention as defined in claim 2 wherein at least one of the two openings of smaller diameter on said one surface is formed by a flange projecting radially inwardly into said cavity.

References Cited in the file of this patent

UNITED STATES PATENTS

| | | |
|---|---|---|
| 1,726,971 | Yarian | Sept. 3, 1929 |
| 1,908,789 | Ragan | May 16, 1933 |
| 1,923,601 | Weaver | Aug. 22, 1933 |
| 1,980,117 | Turner et al. | Nov. 6, 1934 |
| 2,030,441 | Ganz | Feb. 11, 1936 |
| 2,383,378 | Flumerfelt | Aug. 21, 1945 |
| 2,424,431 | Booth | July 22, 1947 |
| 2,488,979 | Kogstrom | Nov. 22, 1949 |
| 2,715,766 | Ricks | Aug. 23, 1955 |
| 2,761,694 | Graham | Sept. 4, 1956 |
| 2,771,300 | Latzen | Nov. 20, 1956 |
| 2,779,603 | McRae | Jan. 29, 1957 |
| 2,797,929 | Herbenar | July 2, 1957 |
| 2,810,596 | Elam | Oct. 22, 1957 |
| 2,835,521 | White | May 20, 1958 |
| 2,855,232 | Kozak | Oct. 7, 1958 |
| 2,880,025 | Herbenar et al. | Mar. 31, 1959 |
| 2,919,150 | Baker | Dec. 29, 1959 |

FOREIGN PATENTS

| | | |
|---|---|---|
| 552,405 | Great Britain | Apr. 6, 1943 |

OTHER REFERENCES

Publication, "Commercial Car Journal," September 1952, page 87.